United States Patent [19]
Bierl et al.

[11] Patent Number: 5,992,535
[45] Date of Patent: Nov. 30, 1999

[54] DUAL ACTING IMPLEMENT LEVELING SYSTEM WITH TRANSPORT STABILIZATION

[75] Inventors: James Franklin Bierl, West Des Moines; Garrett Lee Goins, Rhodes, both of Iowa

[73] Assignee: Deere & Company, Moline, Ill.

[21] Appl. No.: 09/244,295

[22] Filed: Feb. 3, 1999

[51] Int. Cl.[6] .................................................. A01B 59/00
[52] U.S. Cl. ............................................................ 172/328
[58] Field of Search .................................. 172/452, 454, 172/481, 240, 328, 326, 327, 324

[56] References Cited

U.S. PATENT DOCUMENTS 3,912,017  10/1975  Rehn ........................................ 172/328
4,809,786  3/1989  Hoehn et al. ............................ 172/316

*Primary Examiner*—Christopher J. Novosad

[57] ABSTRACT

A dual action leveling system for a disk or similar implement connected between the hitch and the lift wheel assembly includes a transport stop for providing a fixed hitch position for good transport leveling and stability. The system includes a fore-and-aft extending member with first and second coil springs and an adjustable spring abutment member threaded through one end of a rod for providing leveling for different ground conditions. Weight can be transferred to and from the front of the implement by simply turning a crank located at one end of the rod. For example, weight can be transferred to the front of the implement to provide compensation for added weight of a rear mounted attachment. The spring structure provides a self-compensating effect which resists changes in front-to-rear implement leveling with changes in ground conditions.

11 Claims, 3 Drawing Sheets

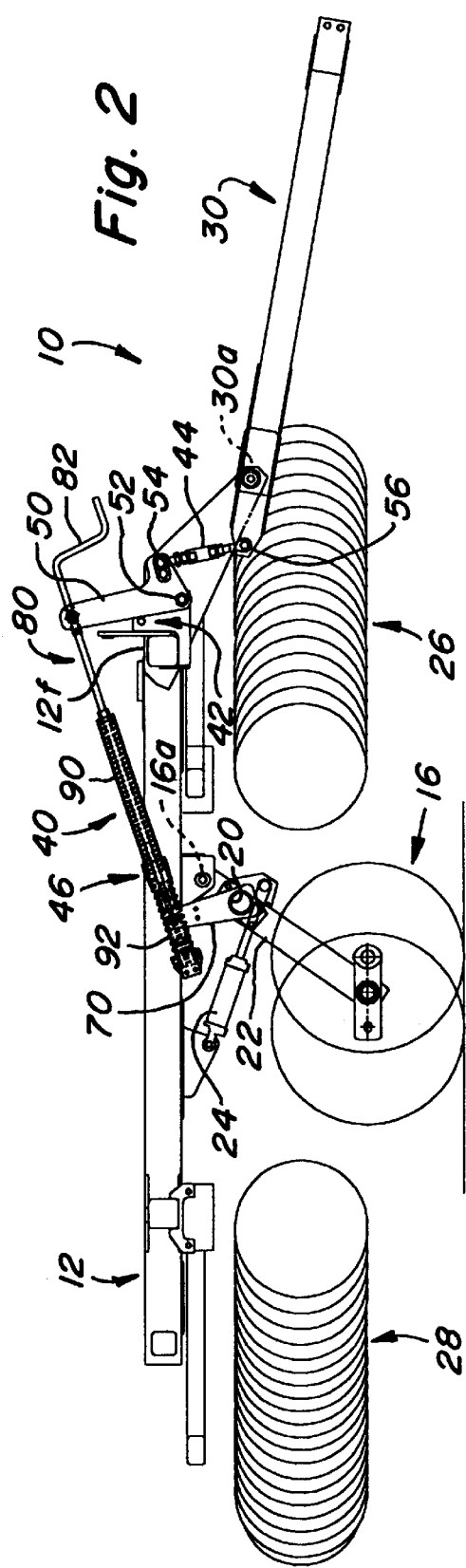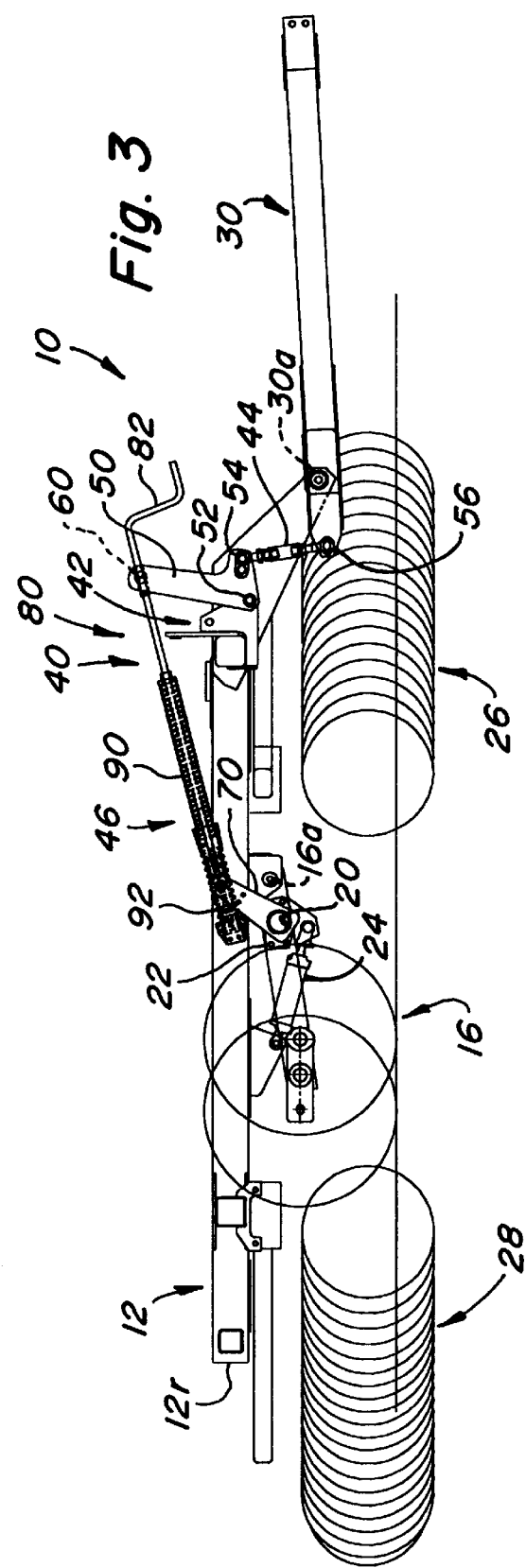

DUAL ACTING IMPLEMENT LEVELING SYSTEM WITH TRANSPORT STABILIZATION

BACKGROUND OF THE INVENTION

1) Field of the Invention

The present invention relates generally to agricultural implements and, more specifically, to a leveling system for a disk or similar implement.

2) Related Art

Disks typically have front and rear gangs mounted on a frame having a forward hitch adapted for connecting to a tractor. Disking performance, transport stability and transport levelness of a disk are affected by many factors, including tractor drawbar heights, field conditions, rear attachments, disk blade diameters, operating speed and operating depth. Many disks have a leveling system connected between the lift system and the hitch to compensate for changes in some of these factors. The leveling system, which usually includes a spring-loaded adjusting member connected to a bell crank, adjusts the front to rear loading on the implement to achieve a better soil profile in the tilled ground. However, a problem occurs when the disk is operating in certain soil conditions or when additional weight is applied to the rear of the machine via rear attachments such as harrows or hitches and the machine becomes rear-heavy. As a result, leveling of the soil while disking is a problem, and the soil profile is less than ideal. This problem is emphasized when the rear attachment on the disk is itself adjustable.

Various spring arrangements have been suggested for compensating for the rear heavy condition, but these have provided only limited relief. Often the spring biasing system fails to provide a positive transport stop and introduces some disk transport instability. Implement leveling during transport also has been troublesome with some of the systems.

BRIEF SUMMARY OF THE INVENTION

It is therefore an object of the present invention to provide an improved leveling system for an implement such as a disk. It is a further object to provide such a system which overcomes most or all of the aforementioned problems.

It is a further object of the present invention to provide an improved implement leveling system which is dual acting and can either raise or lower the front of the implement relative to the back of the implement to adjust the implement for a better tilled soil profile. It is another object to provide such a system which improves stability and leveling during transport compared to previously available dual acting systems.

It is yet another object of the present invention to provide an improved implement leveling system which accommodates changes in weight on the rear of the implement. It is yet another object to provide such a system which is particularly useful with rear-mounted attachments that are vertically adjustable relative to the implement frame, and which provides good leveling and stability characteristics during implement transport.

It is a further object of the invention to provide an implement leveling system which has a self-compensating feature for adapting to changing field conditions.

It is another object of the invention to provide an improved implement leveling system which is adjustable to provide improved soil profile, even when weight is added to the rear of the implement or an adjustable attachment is connected to a portion of the implement. It is a further object to provide such a system which assures that if the implement is leveled properly when the implement frame is lowered for working in the field, the transport position will be correct when the frame is raised. It is still another object to provide such a system which has a positive transport stop for good transport stability and leveling.

The leveling system includes a bell crank pivotally connected to the implement frame and to the hitch and movable with the hitch as the hitch pivots relative to the frame with raising and lowering of the frame by the lift wheel assemblies. An arm connected for movement with the lift wheel assembly is pivotally connected to a fore-and-aft extending U-shaped member supporting front and rear coil springs. A spring abutment member is adjustably located between the coil springs, and an adjustment rod with a crank includes a rear portion threaded into the abutment member. The forward portion of the adjustment rod is connected to the bell crank to pivot with the hitch as the frame is raised and lowered. The coil springs bias the bell crank in a first direction when the frame is raised and in a second direction opposite the first direction when the frame is lowered, thereby providing dual action leveling for the implement frame. A transport stop limits movement of the bell crank to a preselected stop position to provide a generally fixed hitch transport position for stable and level transport. The front coil spring compresses when the bell crank reaches the stop position and facilitates full raising of the implement by the lift wheel assembly. During field-working operations, the rear coil spring biases the front portion of the frame downwardly when the field conditions tend to cause the front portion to lift from the ground, and the front coil spring biases the rear portion downwardly when the field conditions tend to cause the rear portion to lift from the ground, thereby providing a self-compensating effect for the implement. The dual action facilitates good leveling action in the field and provides necessary compensation when rear attachments are used with the implement.

These and other objects, features and advantages of the present invention will become apparent to one skilled in the art upon reading the following detailed description in view of the drawings.

BRIEF DESCRIPTION OF THE DRAWINGS

FIG. 2 is a side view of the disk of FIG. 1 in the transport position, with portions removed to better show the leveling system.

FIG. 3 is a view similar to FIG. 2 but showing the disk in the field-working position.

DETAILED DESCRIPTION OF THE DRAWINGS

Figure 1:
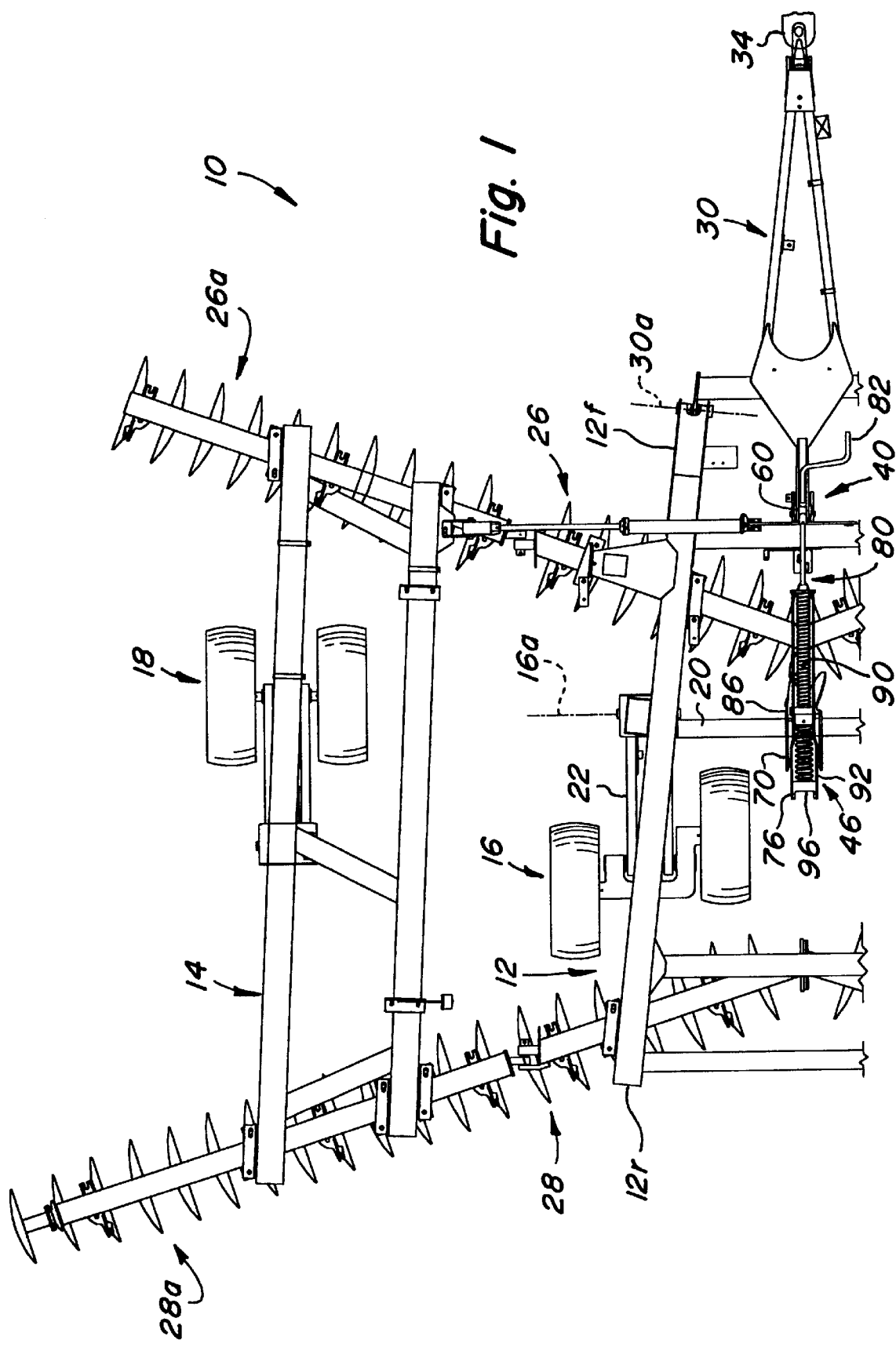
FIG. 1 is a top view of a portion of a disk with a leveling system attached thereto.

Referring now to FIG. 1, therein is shown a portion of an implement such as a disk 10 having a main frame 12 and outer wing frames 14 supported for forward movement over the ground by outer main frame lift wheel assemblies 16 and wing frame wheel lift assemblies 18. The wheel assemblies 16 are spaced on opposite sides of the disk centerline and are connected by a tubular link 20. Each wheel assembly 18 includes a wheel frame 22 and a lift cylinder 24 (FIGS. 2 and 3) connected at one end to the frame 12 and at the opposite end to the wheel frame to move the lift wheel assemblies 16 generally in unison about a pivotal axis 16a to raise and lower the frame relative to the ground. Front and rear disk gangs 26 and 28 are supported from the frame 12. Corresponding outer wing disk gangs 26a and 28a are supported from the wing frames 14.

Hitch structure 30 is pivotally connected to a forward end 12f of the main frame 12 for rocking about a horizontal axis 30a transverse to the forward direction. The forward end of the hitch structure is connected to a hitch 34 on a tractor or other towing vehicle. Spring biased leveling structure indicated generally at 40 is connected between the hitch structure 30 and the rockshaft 20 for pivoting the hitch structure as the disk 10 is moved between the raised transport position (FIG. 2) and the lowered field-working position (FIG. 3) for maintaining the implement in generally a level condition as the frame 12 is raised and lowered. In the fully raised position of the disk 10 (FIG. 2), the leveling structure 40 pivots the forward end of the hitch 30 downwardly relative to the frame 12 until the structure contacts a frame-mounted stop 42 which maintains the hitch in a fixed transport position. An adjustable link 44 provides implement leveling in the transport position. Spring structure 46 facilitates full raising of the implement by the lift wheel assembly when the stop 42 is contacted and also provides a self-compensating effect to resist relative vertical movement of the disk gangs 26 and 28 with changes in field conditions during field-working operations. When the implement 10 is lowered to the field-working position of FIG. 3, the forward end of the hitch 30 is raised by the structure 40. By adjusting the structure 40 as described in detail below, the operator can compensate for different operating factors including the added weight of a rear attachment to provide level operation and the desired tilled soil profile.

The leveling structure 40 includes a bell crank 50 connected at its lower end by a pivot 52 to the frame 12. The bell crank 50 extends forwardly from the pivot 52 to a pivotal connection at 54 with the upper end of the adjustable link 44. The lower end of the adjustable link 44 is pivotally connected to the hitch structure 30 at location 56 rearwardly of the hitch pivotal axis 30a. The upper end of the bell crank 50, which is preferably in the form of a pair of transversely spaced upright plates, pivotally supports a trunnion 60. Forward movement of the upper end of the bell crank 50 (clockwise rotation about the pivot 52) rotates the hitch structure in the counter-clockwise direction to raise the forward end of the hitch structure. Rearward movement of the upper end of the bell crank 50 (counter-clockwise rotation) lowers the forward end of the hitch structure 30. The link 44 is preferably a turnbuckle for adjusting the hitch position to level the implement 10 when the implement is in the transport position (FIG. 2) with the bell crank bottomed against the stop 42.

Figure 4:
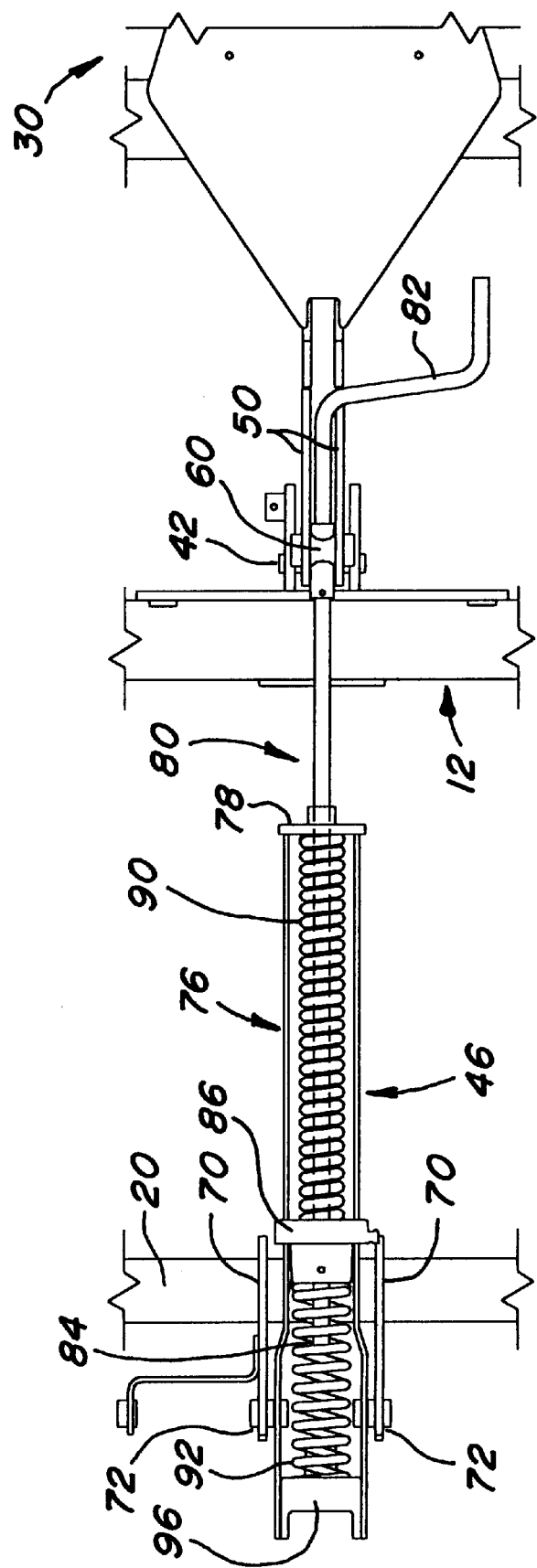
FIG. 4 is an enlarged top view of a portion of the leveling system of FIG. 1.

A lever arm 70 is fixed to and extends upwardly from the tubular link 20 to an upper end pivotally connected at 72 to a rear portion of a U-shaped saddle bracket 76 (FIG. 4) which supports the spring structure 46. The saddle bracket 76 extends forwardly from the pivotal connection 72 to a forward end 78 which rotatably receives an adjustment rod 80 having a forward crank end 82 rotatably received by the turnbuckle 60 and an aft threaded end 84. The end 84 is threaded through an adjustable spring abutment member 86 slidably received between the sides of the U-shaped bracket . Rotation of the adjustment rod 80 moves the member 86 fore-and-aft along the bracket 76 to selectively compress and relax the forward and rear portions of the spring structure 46.

The spring structure 46 includes a front coil spring 90 having a forward end abutting the end 78 of the bracket 76 and an aft end abutting a forward face of the abutment member 86. The spring structure 46 also includes a rear coil spring 92 having a forward end abutting an aft face of the abutment member 86 and an aft end supported by a rear member 96 extending transversely between the sides of the bracket 76. As the frame 12 is raised by extending the cylinders 24, the lever arm 70 is rotated rearwardly (counter-clockwise) to move the saddle bracket 76 rearwardly. The spring 90 tends to compress and urge the member 86 and rod 80 rearwardly, thereby rotating the bell crank 50 in the counter-clockwise direction to lower the front end of the hitch structure 30 (FIG. 2). When the bell crank 50 bottoms against the stop 42, the spring 90 will compress to permit full lowering of the wheel assemblies 16. A fixed, stable transport stop is thus provided for the hitch structure 30. If the height of the forward end of the hitch structure 30 needs to be adjusted for proper transport leveling, the operator simply adjusts the turnbuckle on the adjustable link 44.

In the field, the operator lowers the frame 12 from the position shown in FIG. 2 to the position shown in FIG. 3 by retracting the cylinders 24. The lever arm 70 rotates forwardly (clockwise), and the rear spring 92 biases the member 86 and the rod 80 forwardly, thereby rotating the bell crank 50 forwardly (clockwise) which in turn raises the forward end of the hitch structure 30 to level the implement for the tillage operation. If for any reason the front gangs 26 are lifting too high relative to the rear gangs 28, the operator can provide more down force on the front of the frame by rotating the crank 82 to move the abutment member 86 rearwardly in the saddle bracket 76. The rear spring 92 is compressed and the front spring 90 is relaxed to urge the rod 80 forwardly and thereby lift the forward end of the hitch structure to increase the down force on the front gangs 26. This feature is particularly useful when attachments are connected to the rear 12r of the frame 12 and the frame becomes rear heavy. Conversely, if conditions cause the front gangs 26 to drop too deeply, the operator rotates the crank 82 in the opposite direction to move the abutment member 86 forwardly to compress the spring 90 and relax the spring 92, which puts the rod 80 in tension to rotate the bell crank 50 rearwardly (counter-clockwise) and lower the forward end of the hitch structure 30 to lift the front of the frame 12.

An additional advantage of the system is realized during disking operations when conditions change (hard to soft ground; rough beds; etc.) and the disk frame 12 tends to move up or down because of the changes in the forces on the front gangs 26. When the front gangs 26 want to drop causing the hitch structure to want to rotate in the counter-clockwise direction (as viewed in FIG. 3), the bell crank 50 will be urged in the clockwise direction resulting in additional up-force caused by compression of the front leveling spring 90, thereby resisting the field-induced condition. Conversely, if the front gangs 26 want to raise, counter-clockwise rotation of the bell crank 50 results, and additional down-force caused by compression of the rear leveling spring 92 compensates for the field-induced condition. Thus the present leveling system has a disk stabilizing effect during disking as well as during transport. With the above-described system, if the disk is adjusted for level disking, level and stable transport will result.

Having described the preferred embodiment, it will become apparent that various modifications can be made without departing from the scope of the invention as defined in the accompanying claims.

We claim:

1. In an implement having a fore-and-aft extending frame with forward and aft mounted earthworking tools, a movable lift wheel assembly for raising and lowering the frame between field-working and transport positions, and a hitch pivotally connected to the frame and extending forward therefrom to a connector adapted for attachment to a towing vehicle, a leveling system for limiting relative vertical movement of the front and rear portions of the frame as the implement is raised to the transport position and lowered to the field-working position and for adjusting the attitude of the implement in different field-working conditions, the leveling system comprising:

a bell crank pivotally connected to the frame and to the hitch and movable with the hitch as the hitch pivots relative to the frame as the frame is raised and lowered by the lift wheel assembly;

an arm connected for movement with the lift wheel assembly;

an adjustment member connected to the bell crank;

spring structure connected between the adjustment member and the bell crank and movable with the arm as the lift assembly is moved to raise and lower the implement, the spring structure biasing the bell crank in a first direction when the frame is raised and in a second direction opposite the first direction when the frame is lowered, thereby providing dual action leveling for the implement frame; and a transport stop limiting movement of the bell crank to a preselected stop position to provide a generally fixed hitch transport position for stability during transport, the spring structure facilitating full raising of the implement by the lift wheel assembly when the bell crank reaches the stop position.

2. The leveling system of claim 1 further comprising an adjustable length link extending between the bell crank and the hitch, the adjustable length link providing frame leveling when the implement is in the transport position.

3. The leveling system of claim 1 wherein the spring structure includes a front spring and a rear spring, and further comprising an adjustable spring abutment member located between the front and rear springs, wherein the adjustment member moves the abutment member fore-and-aft to change compression of the first and second springs.

4. The leveling system of claim 3 wherein the first and second springs provide self-compensating effect to resist vertical movement of the front tools relative to the back tools as the implement encounters changing ground conditions.

5. The leveling system as set forth in claim 3 wherein the front spring is compressed as the transport stop limits the movement of the bell crank to the stopped position.

6. In an implement having a fore-and-aft extending frame with forward and aft earthworking tools mounted on front and rear portions of the frame, respectively, a movable lift wheel assembly for raising and lowering the frame between field-working and transport positions, and a hitch pivotally connected to the frame and extending forward therefrom to a connector adapted for attachment to a towing vehicle, a leveling system for limiting relative vertical movement of the front and rear portions of the frame as the implement is raised to the transport position and lowered to the field-working position and for adjusting the attitude of the implement for different field-working conditions, the leveling system comprising:

a bell crank pivotally connected to the frame and to the hitch and movable with the hitch as the hitch pivots relative to the frame as the frame is raised and lowered by the lift wheel assembly;

an arm connected for movement with the lift wheel assembly;

a fore-and-aft extending adjustment member having a forward end connected to the bell crank;

fore-and-aft extending spring structure connected between the adjustment member and the bell crank and movable with the arm as the lift assembly is moved to raise and lower the implement, the spring structure biasing the bell crank in a first direction when the frame is raised and in a second direction opposite the first direction when the frame is lowered; and a transport stop limiting movement of the bell crank to a preselected stop position to provide a generally fixed hitch transport position, the spring structure facilitating continued movement of the arm and the lift wheel assembly and full raising of the implement by the lift wheel assembly when the transport stop reaches the stop position.

7. The leveling system as set forth in claim 6 wherein the transport stop includes a stop member contacting the bell crank when the transport position is reached.

8. The leveling system as set forth in claim 6 wherein the spring structure includes first and second axially aligned coil springs, and including an adjustable spring abutment located between the coil springs, wherein the adjustment member includes a threaded rod extending through the first coil spring and threadingly engaging the adjustable spring abutment, wherein rotation of the threaded rod moves the spring abutment in the fore-and-aft direction to change the relative compression of the first and second coil springs.

9. The leveling system as set forth in claim 8 further including an adjustable link connected between the hitch and the bell crank, the position of the hitch when the bell crank is in the preselected stopped position being adjustable with adjustment of the link.

10. The leveling system as set forth in claim 8 wherein one of the first and second coil springs bias the front portion of the frame downwardly when the field conditions tend to cause the front portion to lift from the ground, the other one of the coil springs biasing the rear portion downwardly when the field conditions tend to cause the rear portion to lift from the ground, thereby providing a self-compensating effect for the implement.

11. The leveling system as set forth in claim 10 wherein the rear portion of the frame is adapted for supporting a rear implement attachment, the coil springs providing bias for the front portion of the frame to compensate for added weight of the rear attachment to the rear portion of the frame.

* * * * *